United States Patent [19]
Morgan et al.

[11] Patent Number: 6,054,985
[45] Date of Patent: Apr. 25, 2000

[54] DATA PROCESSING SYSTEM AND METHOD FOR SIMULATING COMPOUND OBJECTS

[75] Inventors: Scott Anthony Morgan; John Martin Mullaly; Craig Ardner Swearingen, all of Austin, Tex.

[73] Assignee: International Business Machines Corporation, Armonk, N.Y.

[21] Appl. No.: 08/789,030

[22] Filed: Jan. 27, 1997

[51] Int. Cl.⁷ ................................................... G06F 3/00
[52] U.S. Cl. .................. 345/342; 345/346; 345/435; 345/438; 345/439; 345/156
[58] Field of Search .................. 345/344, 342–346, 345/356, 332, 329, 429, 433, 435

[56] References Cited

U.S. PATENT DOCUMENTS

| | | |
|---|---|---|
| 4,899,136 | 2/1990 | Beard et al. . |
| 4,939,507 | 7/1990 | Beard et al. . |
| 5,031,117 | 7/1991 | Minor et al. . |
| 5,060,135 | 10/1991 | Levine et al. . |
| 5,113,517 | 5/1992 | Beard et al. . |
| 5,245,700 | 9/1993 | Fossum . |
| 5,261,044 | 11/1993 | Dev et al. . |
| 5,276,783 | 1/1994 | Fossum . |
| 5,276,785 | 1/1994 | Mackinlay et al. . |
| 5,283,860 | 2/1994 | Einkauf et al. . |
| 5,355,447 | 10/1994 | Knowlton . |
| 5,388,202 | 2/1995 | Squires et al. . |
| 5,464,362 | 11/1995 | Orton et al. ............................. 395/700 |
| 5,479,603 | 12/1995 | Stone et al. . |
| 5,491,781 | 2/1996 | Gasperina . |
| 5,524,199 | 6/1996 | Orton et al. . |
| 5,544,302 | 8/1996 | Nguyen . |
| 5,572,649 | 11/1996 | Elliot et al. ............................. 345/340 |
| 5,880,725 | 3/1999 | Southgate ............................. 345/340 |
| 5,893,082 | 4/1999 | McCormick ....................... 345/340 X |
| 5,917,498 | 6/1999 | Korenshtein ............................. 345/433 |

OTHER PUBLICATIONS

Jerry M. Rosenberg, "Dictionary of Computers, Information Processing & Telecommunictions" 2nd Edition, John Wiley & Sons, 1984.

Robert Cowart, "Mastering Windows 3.1", Special Edition, Sybex Inc., p. 21, FIG. 1.10, 1993.

Burge, Thomas E., et al., *Advanced OS/2™ Presentation Manager Programming*, John Wiley & Sons, Inc., New York, NY, pp. 37–38.

*Object–Oriented Interface Design: IBM Common User Access™ Guildelines*, Que Corporation, Carmel, IN, ©Copyright IBM Corp. 1989, 1992, pp. 43–45, 55–57, 235, 329, 342, 497, 654.

(List continued on next page.)

*Primary Examiner*—Mark R. Powell
*Assistant Examiner*—Chante' Harrison
*Attorney, Agent, or Firm*—Winstead Sechrest & Minick P.C.; Volel Emile

[57] ABSTRACT

A data processing system and method is provided for performing "drag and drop" operations of compound objects using system platforms, such as JAVA, which do not support compound objects or nested containment interface designs. In the data processing system and method of operating said system, a container object will include software and logic necessary to call up a contained object in a separate window. The second window is then handled by a window associated with the container object and a modified parent-child relationship. A size and a position of the second window are defined relative to the first window. Therefore, the second window associated with the contained object can be super imposed and precisely positioned over the window associated with the container object. Furthermore, when the window associated with the container object is dragged or resized, the position and size of the second window are modified and moved in unison. However, it should be noted that the second window associated with a contained object can be dragged independently. Thus, the contained object may be dragged from the container object.

17 Claims, 10 Drawing Sheets

OTHER PUBLICATIONS

Mackinlay, Jock D., et al., "Rapid Controlled Movement Through a Virtual 3D Wordspace," *ACM Computer Graphics*, vol. 24, No. 4, Aug. 1990, (SIGGRAPH '90, Dallas, Aug. 6–10, 1990), pp. 171–176.

*Microsoft® OS/2 Programmer's Reference*, vol. 1, Microsoft Press, Redmond, Washington, ©Copyright Microsoft Corporation, 1989.

Muller, Nathan, "Dial 1–800–Internet," *BYTE*, Feb. 1996, pp. 83–88.

*The Windows™ Interface: An Application Design Guide*, Microsoft Programming Series, Microsoft Press, Redmond, Washington, ©Copyright 1987, 1992 Microsoft Corporation, pp. 126–127.

Wayner, Peter, "Hey Baby, Call Me at My IP Address," *BYTE*, Apr. 1996, pp. 142–144.

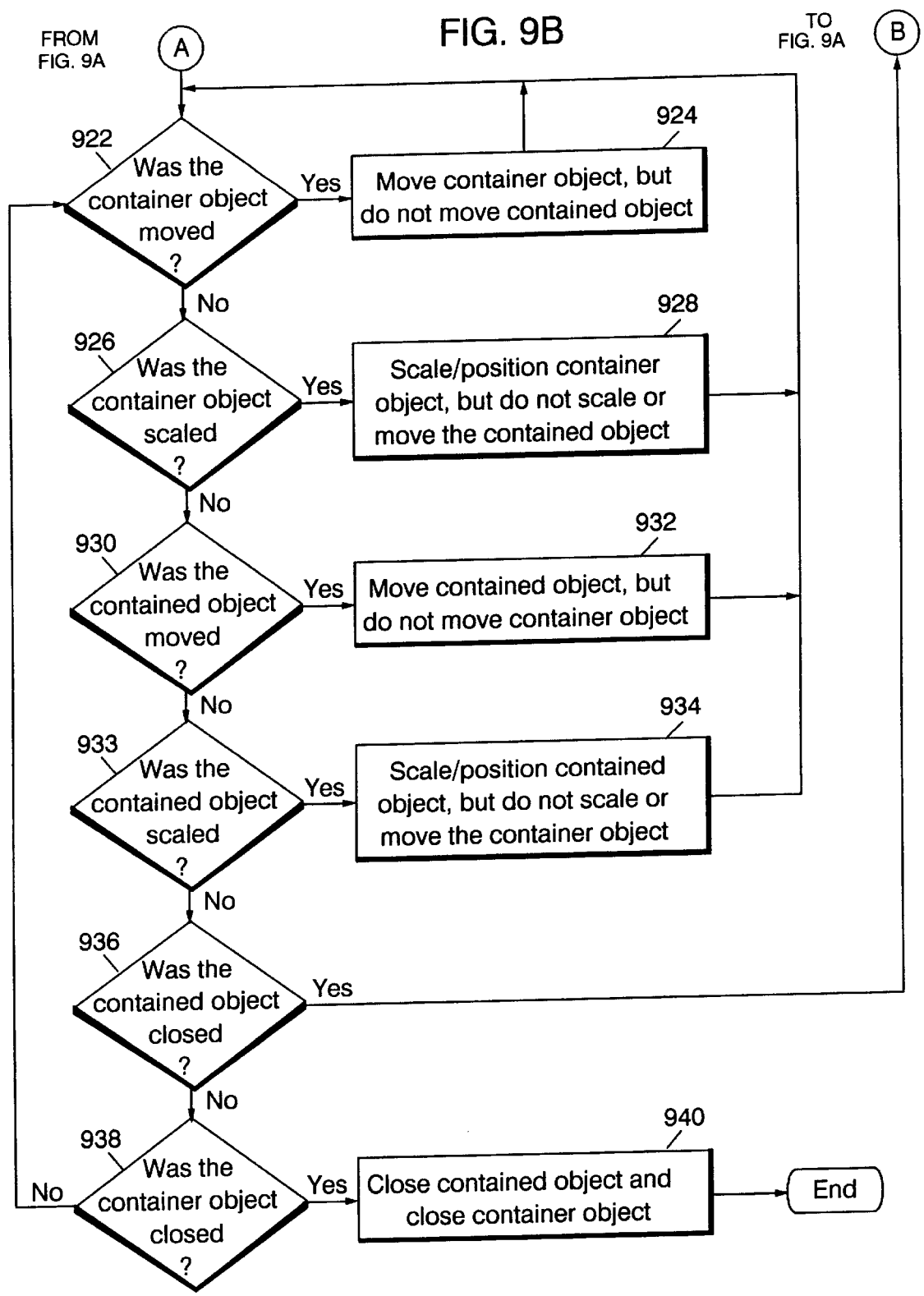

DATA PROCESSING SYSTEM AND METHOD FOR SIMULATING COMPOUND OBJECTS

CROSS-REFERENCE TO RELATED APPLICATIONS

The present application is related to the following applications:

Ser. No. 08/753,081, entitled "CREATING REAL-WORLD OBJECTS" (Attorney Docket No. AT9-96-204);

Ser. No. 08/753,082, entitled "DATA PROCESSING SYSTEM AND METHOD FOR CONTROLLING A VIEW OF A REALISTIC OBJECT IN A DISPLAY DEVICE" (Attorney Docket No. AT9-96-212);

Ser. No. 08/753,077, entitled "PRIORITIZATION OF BACKGROUND DISPLAY DURING ANIMATION" (Attorney Docket No. AT9-96-213);

Ser. No. 08/753,122, entitled "MULTIFUNCTIONAL OBJECT" (Attorney Docket No. AT9-96-214);

Ser. No. 08/753,076, entitled "SYSTEM AND METHOD FOR MAINTAINING SIZE AND POSITION RELATIONSHIPS FOR NON-RECTANGULAR REAL-WORLD OBJECTS" (Attorney Docket No. AT9-96-237);

Ser. No. 08/753,124, entitled "DATA PROCESSING SYSTEM AND METHOD FOR SCALING A REALISTIC OBJECT ON A USER INTERFACE" (Attorney Docket No. AT9-96-240);

Ser. No. 08/753,078, entitled "DATA PROCESSING SYSTEM AND METHOD FOR VIEWING OBJECTS ON A USER INTERFACE" (Attorney Docket No. AT9-96-241);

Ser. No. 08/753,079, entitled "DATA PROCESSING SYSTEM AND METHOD FOR PERFORMING AUTOMATIC ACTIONS IN A GRAPHICAL USER INTERFACE" (Attorney Docket No. AT9-96-242); and Ser. No. 08/753,123, entitled "DATA PROCESSING SYSTEM AND METHOD FOR MODIFYING A SIZE OF A REALISTIC OBJECT ON A USER INTERFACE" (Attorney Docket No. AT9-96-246).

All of the above applications were filed on Nov. 20, 1996 and are assigned to the assignee of the present patent application.

TECHNICAL FIELD

The present invention relates in general to a graphical user interface, and, in particular, to a graphical user interface in a development system which does not support compound objects or nested containment.

BACKGROUND INFORMATION

Current trends in software design and software development are object-oriented interface design and JAVA code development. As is well-known in the data processing art, JAVA is a representative type of software code which is utilized in developing graphical user interfaces, especially for Internet applications.

The design of user interfaces and the development of code to support those interfaces should be complementary, but, in fact, these two factors are somewhat incongruent. For example, JAVA does support "drag and drop" operations of objects within a container, but does not support dragging contents out of a JAVA application into another JAVA application. JAVA also does not support the movement of objects to or from a desktop which is not in a JAVA window controlled by the same application. This type of operation is one of the fundamental requirements of an effective object-oriented user interface design and is not supported by many development systems, as exemplified by JAVA.

A "drag and drop" operation is a common user interface operation which allows a user to directly manipulate an object by moving it and placing it somewhere else using a pointing device displayed on a terminal of a computer, or data processing system. Furthermore, a compound object is an object that contains other objects and results in a view in which relationships of the parts contribute to an overall meaning associated with the object. An object whose specific purpose is to hold other objects is referred to as a container object and the other objects held within the container object are referred to as contained objects. Given that JAVA only supports "drag and drop" operations within a single application's windows, the development of software products using a JAVA interface will be compromised. In other cases, a user interface may simply not be implemented using JAVA and, therefore, JAVA must be discarded as a suitable development language or framework.

When using a platform such as JAVA, containers may support the "drag and drop" operations of objects within the same container. However, in these systems, a contained object may not be dragged out of its container. As an example of an object-oriented user interface design which is limited by the restrictions described above with respect to platforms such as JAVA, consider a musical compact disc (CD) object which is designed to contain a book that can be taken out of the opened CD case. In a development system such as JAVA, this action is prevented by the inability to drag an object out of its container.

Therefore, a need exists for a method and data processing system for performing "drag and drop" operations of compound objects where such support does not otherwise exist to effectively allow object-oriented user interface design to be developed within system platforms which do not support compound objects or nested containment.

SUMMARY OF THE INVENTION

The previously mentioned needs are fulfilled with the present invention. Accordingly, there is provided, in one form, a data processing system. The data processing system includes display device for displaying a first window and a second window wherein the second window is selectively super imposed over the first window. The data processing system also includes a user interface for receiving a plurality of control inputs for controlling an appearance of the first window and the second window displayed by the display device. The data processing system further includes a data processor comprising a central processing unit. The central processing unit is connected to the user interface for receiving the plurality of control inputs. The central processing unit is also connected to the display device to provide a plurality of object control signals for selectively modifying an appearance of the first window and an appearance of the second window concurrently when the second window is super imposed over the first window.

Additionally, there is provided in a second form, a method for simulating compound objects in a data processing system. The method includes the steps of displaying a first window on the display device, displaying a second window on the display device, and selectively simulating a compound object on the display device by super imposing the second window over the first window. The method also includes the step of selectively modifying an appearance of the first window and the second window concurrently when the second window is in a super imposed position and selectively independently modifying the appearance of the first window and the appearance of the second window when the second window is in a first position, wherein the first position is distinguishable from the super imposed position.

Furthermore, there is provided in a third form, a program storage device readable by a machine, tangibly embodying a program of instructions executable by the machine to perform method steps for simulating compound objects in a data processing system. The method steps include steps of displaying a first window on the display device, displaying a second window on the display device, and selectively simulating a compound object on the display device by super imposing the second window over the second window. The method steps also include a step of selectively modifying an appearance of the first window and the second window concurrently when the second window is in a super imposed position. The method steps further include a step of selectively independently modifying the appearance of the first window and the appearance of the second window when the second window is in a first position, wherein the first position is distinguishable from the super imposed position.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 9-B illustrates, in flow diagram form, a second portion of the methodology of FIG. 9-A.

DETAILED DESCRIPTION

Figure 1:
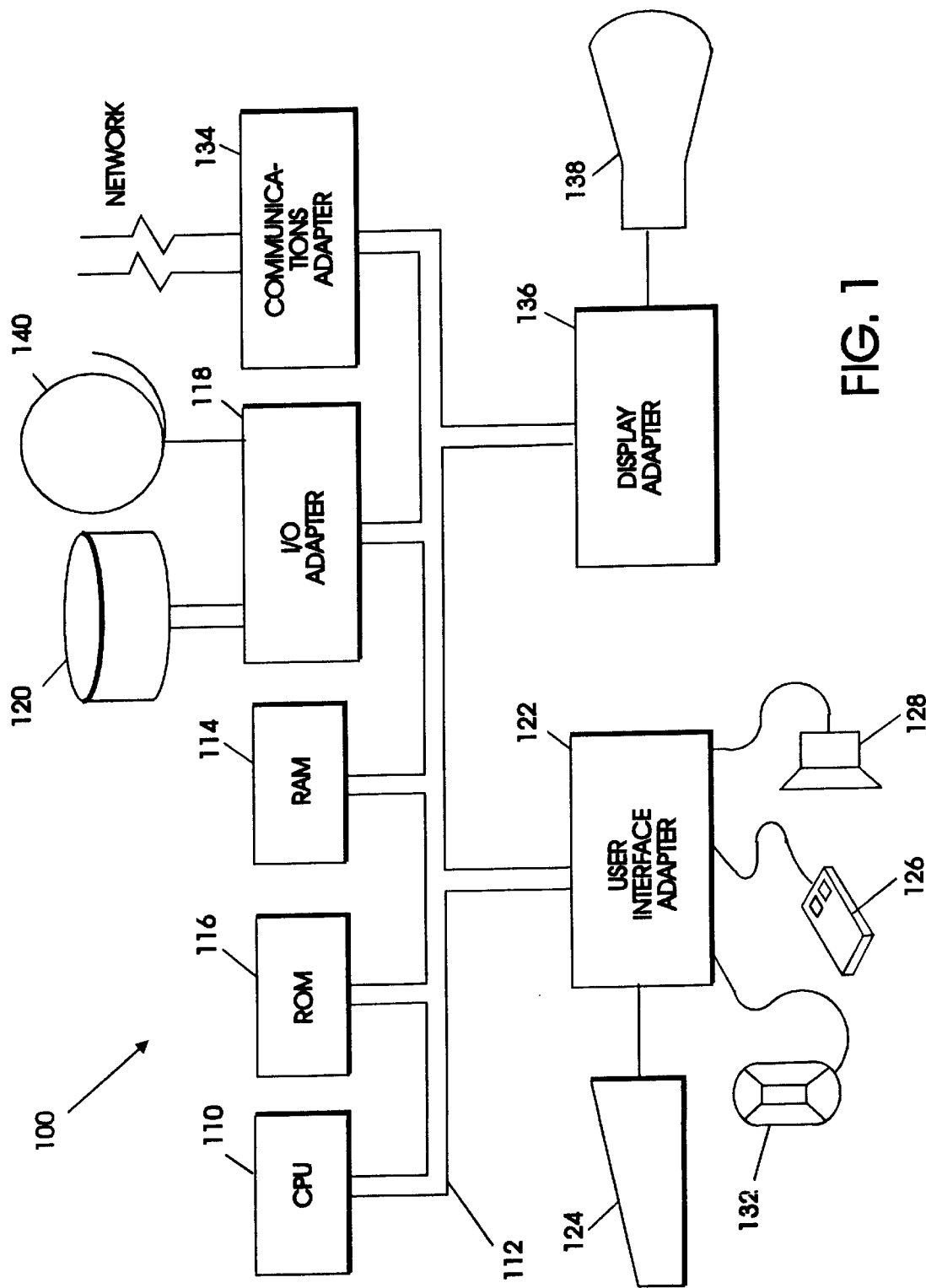
FIG. 1 illustrates, in block diagram form, a data processing system in accordance with one embodiment of the present invention.

The present invention provides a data processing system and method for performing "drag and drop" operations of compound objects using system platforms, such as JAVA, which do not support compound objects or nested containment interface designs. In the present invention, a container object will include software and logic necessary to call up a contained object in a separate window. The second window is then handled by a window associated with the container object in a modified parent-child relationship. The size and position of the second window are defined relative to the first window. Therefore, the second window associated with the contained object can be superimposed and precisely positioned over the window associated with the container object. Furthermore, in the present invention, when the window associated with a container object is dragged or resized, the position and size of the second window are modified and moved in unison. However, it should be noted that in the present invention, the second window associated with the contained objects can be dragged independently. Thus, the contained object may be dragged from the container object. Implementation of the functionality of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning ting considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numerals through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to *The PowerPC Architecture: A Specification for a New Family of RISC Processors*, 2d edition, 1994, Cathy May, et al., Ed., which is hereby incorporated herein by reference. A more specific implementation of a PowerPC microprocessor is described in the *PowerPC 604 RISC Microprocessor Users Manual*, 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, track-ball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, optical, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

In describing operation of the present invention, it will be useful to illustrate the functionality with a concrete example. Therefore, a CD case which includes a book such as those typically found with CDs will be described and illustrated herein. However, it should be well-known to those with skill in the art that any container object and any contained objects may be used to implement the methodology of the present invention. For example, while a compact disc will be discussed in the following description of the invention, it should be noted that the present invention may be expanded to apply to other objects not described in detail herein. Examples of such objects include, but are not limited to, bookshelves which store books and file cabinets which store files.

As previously mentioned, an embodiment of the present invention is illustrated in FIG. 1. In this embodiment, assume a software program which implements the present invention is stored in either ROM 116 or RAM 114 and execution of this software program is controlled by CPU 110. By accessing the software program in either ROM 116 or RAM 114, a contained object may be removed from a container object to implement an effective object-oriented interface design in a development system which does not support such an operation.

Figure 2:
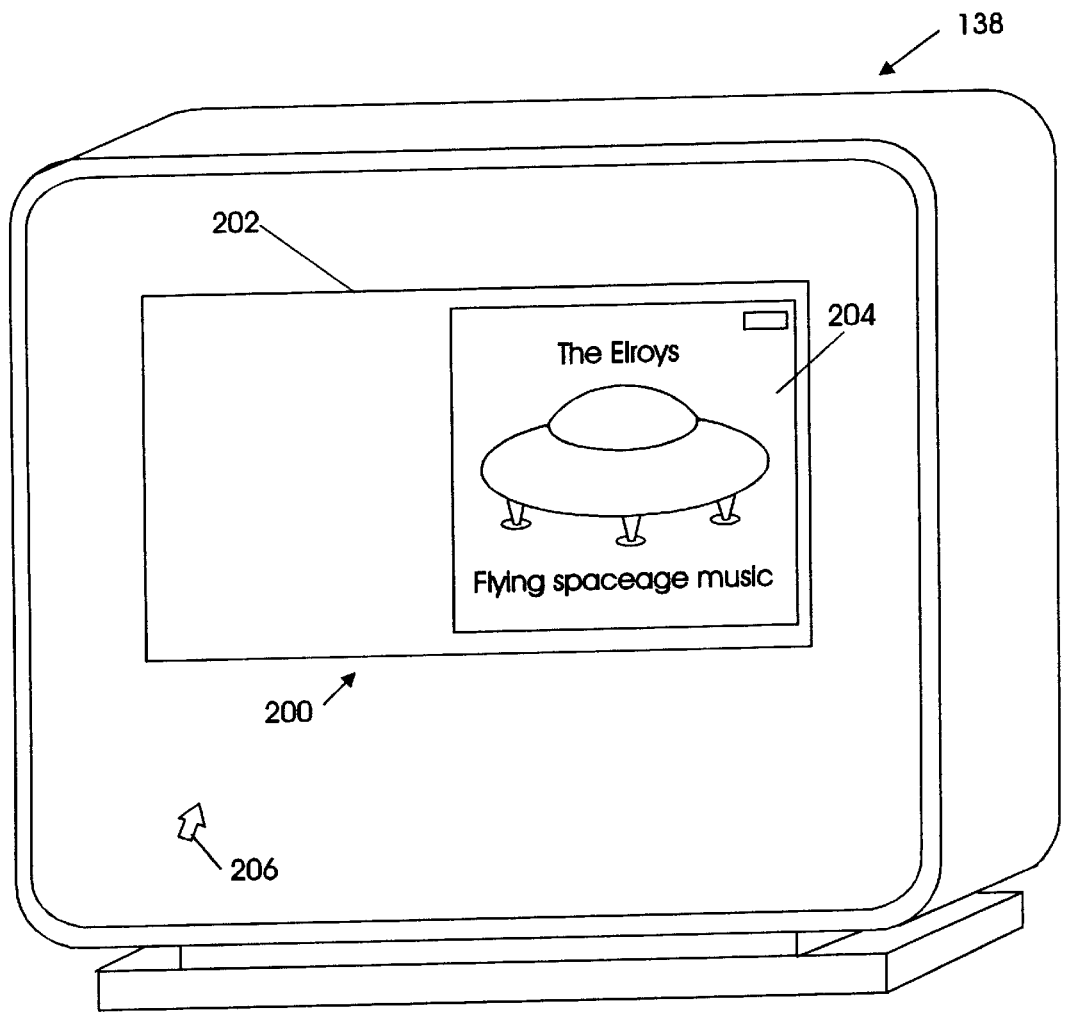
FIG. 2 illustrates, in block diagram form, a display device in accordance with one embodiment of the present invention.

FIG. 2 illustrates an image of a compact disk 200 as it appears on display device 138. Compact disk 200 comprises a container object 202 and a contained object 204. In the present example, container object 202 is implemented as a compact disc cover and contained object 204 is implemented as a descriptive pamphlet which corresponds to a compact disk "held" by compact disk 200. Furthermore, as illustrated on display device 138, a cursor 206 is provided. Cursor 206 is provided to allow an external user to access compact disc 200. Control of cursor 206 is provided from a user interface which is keyboard 124, mouse 126, or track ball 132. The input signal is provided to user interface adapter 122 and subsequently passed to CPU 110 using programs stored in either one of ROM 116 and RAM 114. Such control is well-known to those with skill in the data processing art and will not be described in greater detail herein.

To use compact disk 200 illustrated on display device 138, the user must move cursor 206 to open a window of the container object The step of opening a window of the container object is well-known to those with skill in the art. An example of such an operation would be to use mouse 126 to control cursor 206 to access an icon, or similar representation of display device 138, and click thereon. Similarly, if keyboard 124 is being used to control cursor 206, pressing the "enter" key will enable the container object associated with compact disk 200 to be opened.

During operation of the present invention, when a window associated with a container object, such as container object 202 of compact disk 200, is opened, a window of a contained object is also opened. Therefore, in the present invention, when compact disk 200 is accessed using cursor 206, a window associated with container object 202 is opened. Subsequently, a window of contained object 204 is opened. It should be noted that when the contained object 204 is opened, the position and the dimensions of contained object 204 relative to container object 202 are specified by the software program stored in a memory of data processing system 100.

Figure 3:
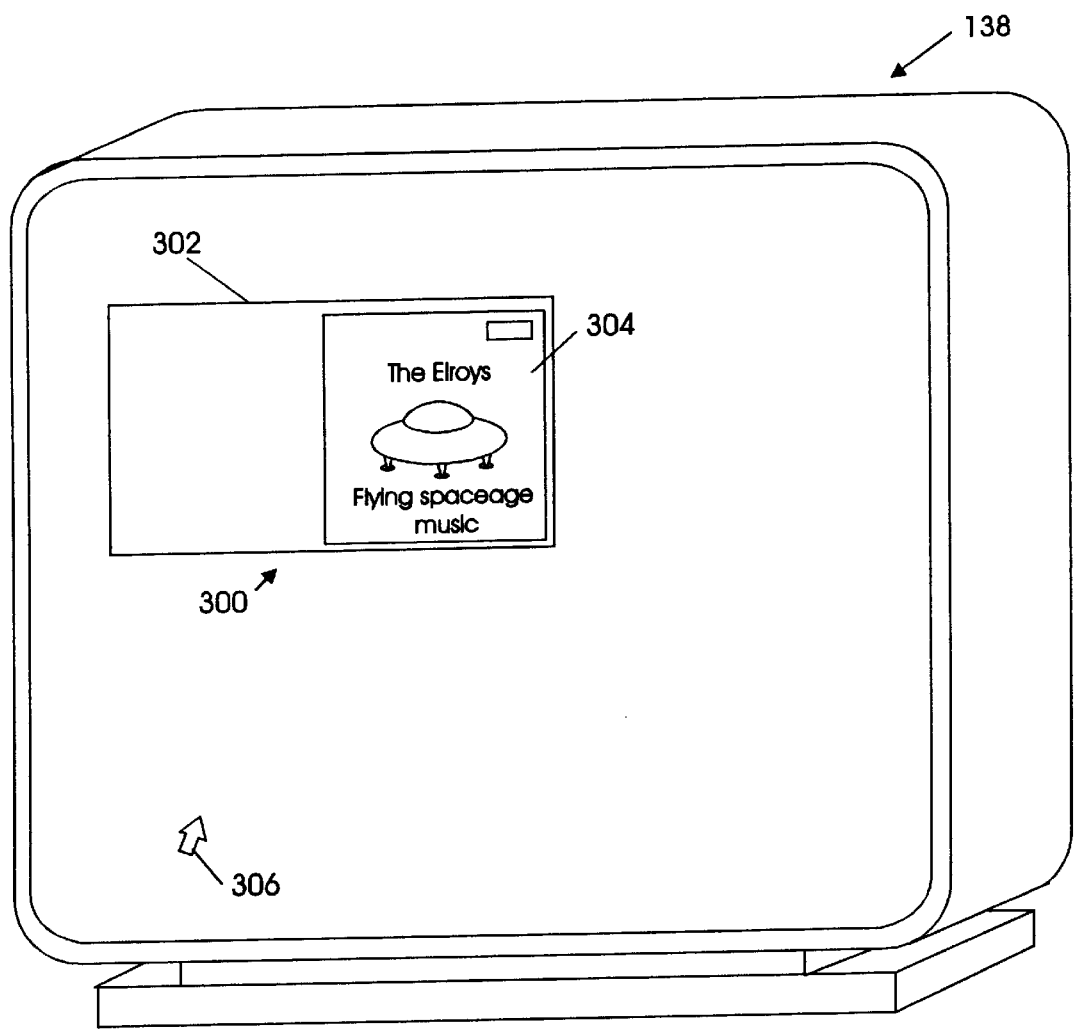
FIG. 3 illustrates, in block diagram form, a display device in accordance with one embodiment of the present invention.

When the contained object 204 is still located within container object 202, compact disk 200 may be moved and scaled as a single object. An example of a scaled version of compact disk 200 is illustrated in FIG. 3. FIG. 3 provides a scaled compact disk 300 which includes a container object 202 and a contained object 204. When a user desires to size a compact disk to be larger or smaller, a cursor displayed on display device 138, such as cursor 306, must be placed on the edge of the compact disk, such as compact disk 300. For example, when cursor 306 is placed at an edge of compact disk 300 and engaged to resize compact disk 300 by clicking on a mouse or typing on a keyboard, cursor 306 may be dragged either inward or outward to stretch or shrink compact disk 300 while maintaining its proper proportions. The sizing is effected by dragging cursor 306 inward or outward to modify both the vertical and the horizontal dimensions of compact disk 300 in a proportional manner. A typical manner in which an object is sized is described in *Object-Oriented Interface Design, IBM Common User Access Guidelines,* First Edition, published by QUE Corporation in December 1992, which is hereby incorporated by reference.

Figure 4:
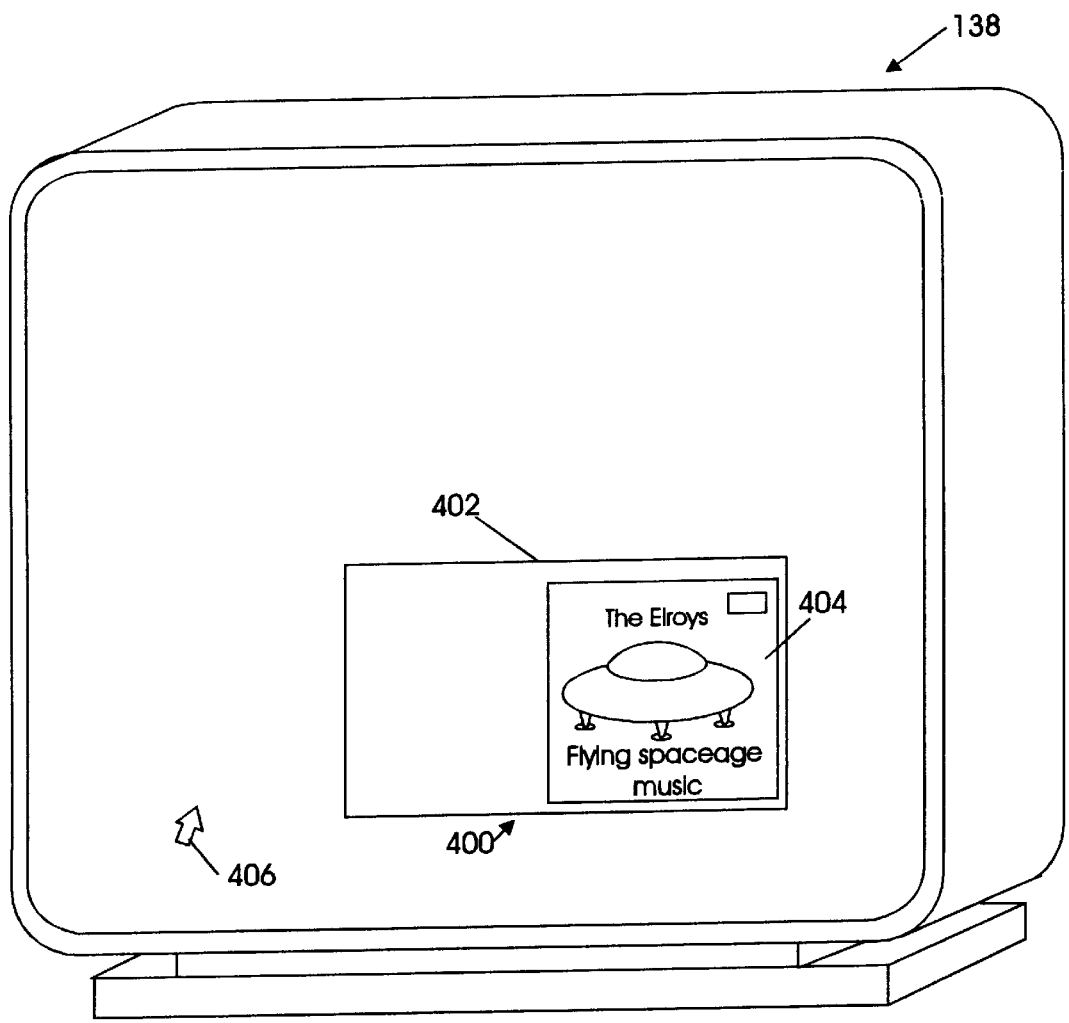
FIG. 4 illustrates, in block diagram form, a display device in accordance with one embodiment of the present invention.

As well as being resized, a compact disk illustrated on display device 138 may also be moved. Such a move operation is illustrated in FIG. 4. As may be seen in FIG. 4, resized compact disk 300 (of FIG. 3) has been moved to provided a moved compact disk 400. Resized compact disk 300 may be moved when cursor 406 is placed on compact disk 400 and engaged to move compact disk 300 by clicking on a mouse or typing on a keyboard. After cursor 406 has been engaged to move the compact disk illustrated on display device 138, cursor 406 may be dragged to move the compact disk to a new location. Again, a typical manner in which an object is moved is described in the previously mentioned *Object-Oriented Interface Design IBM, User Access Guidelines.*

In each of the above-mentioned operations, a compact disk which includes both the container object and the contained object, is displayed, resized, and moved as an integrated object. It should be noted that each of these operations may be supported by JAVA. However, as previously mentioned, JAVA and other development systems, did not support "drag and drop" operations of objects within a compound object structure. Stated another way, JAVA does not support the movement of a contained object outside of the container object. Such a movement is often desired and required for an effective object-oriented interface design.

The present invention provides the methodology which allows for "drag and drop" operations of contained objects to be supported. The present invention achieves this operation by simulating a containment relationship between a contained object and the container object. Therefore, rather than actually containing the contained object, the container object contains logic necessary to generate the contained object in a separate window. The second window is then handled by the container object in a parent-child relationship. For example, the second window size and position are defined relative to the first, so that the contained object window can be super-imposed and precisely positioned over the container object window. When the container object window is dragged, the position of the contained object is moved in unison. However, the contained object window can be dragged independently. Therefore, the contained object may be dragged out of the container object.

Figure 5:
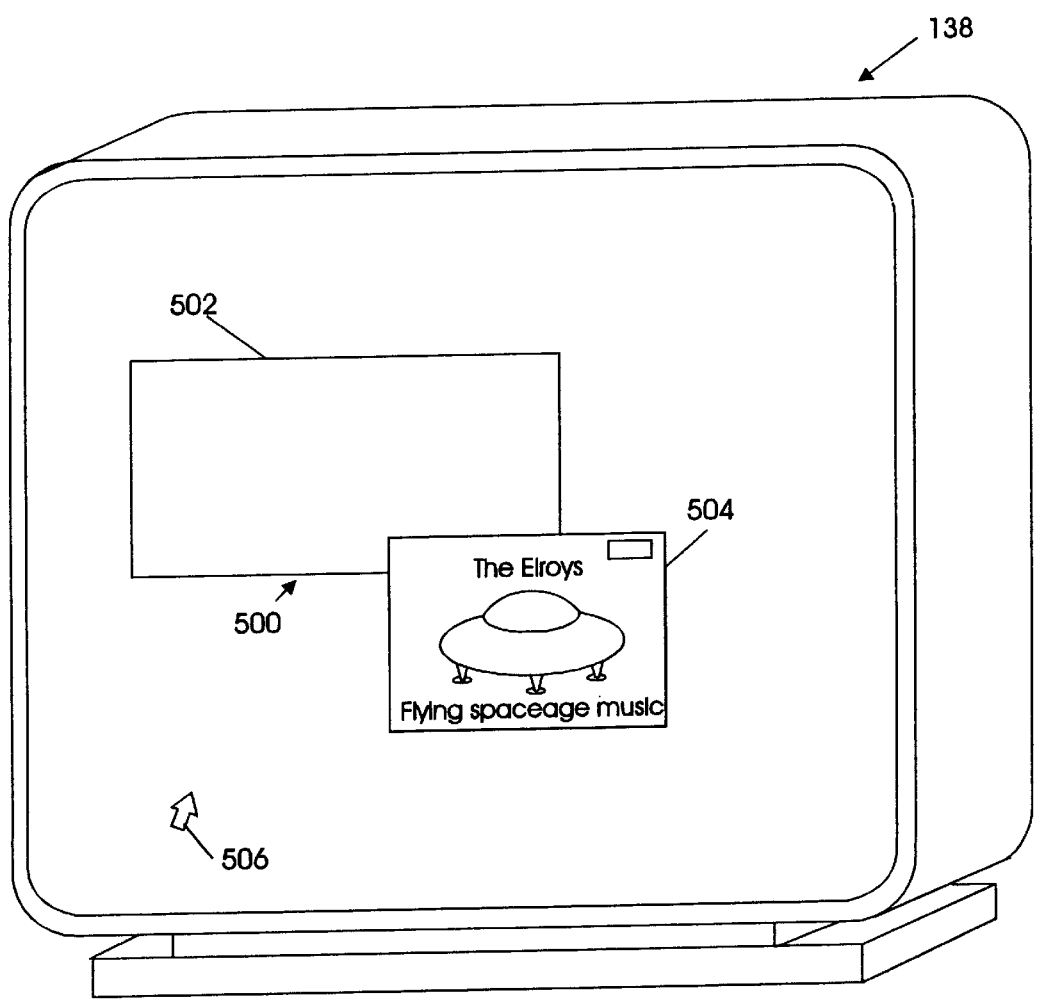
FIG. 5 illustrates, in block diagram form, a display device in accordance with one embodiment of the present invention.

FIG. 5 illustrates display device 138 in which the contained object has been removed from the container object. As illustrated therein, the contained object 204, a CD pamphlet has been removed from container object 202. As may be seen in FIG. 5, a user may simply view this operation as removing a contained object from a container object using a "drag and drop" operation. It would not appear to a user of the system that JAVA, or any other development system, did not support such operations. Therefore, by implementing each object as a separate window and then superimposing one of the objects over the other, a container object having a contained object which may be "dragged and dropped" is effectively simulated. Thus, a user may simply use cursor 506 to identify that contained object 204 is desired to be moved from container object 202. By directing cursor 506 in a desired direction, contained object 204 will follow and be moved to a new location on display device 138. Again, it should be noted that the methodologies used to move a window in a JAVA development system, or most known development systems, is well known and will not be described in greater detail herein.

Figure 6:
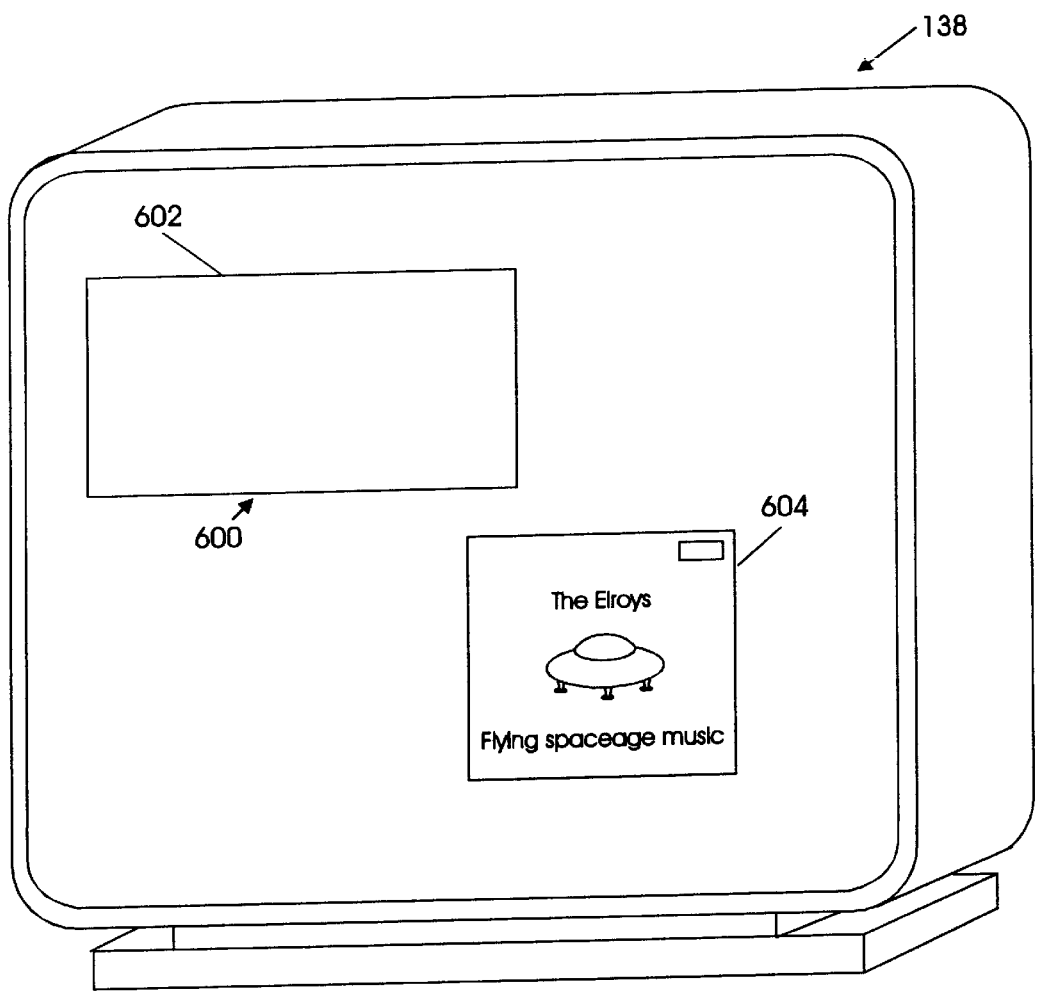
FIG. 6 illustrates, in block diagram form, a display device in accordance with one embodiment of the present invention.

Given that the contained object is an independent window which is superimposed over a window of the container object, the simulation of containment is ended when the contained object is dragged out of its container. Therefore, when the container object is sized, the contained object will not likewise be sized. An example of this is illustrated in FIG. 6. As illustrated in FIG. 6, a container object 202 has been resized. However, the contained object 204 of compact disk 600 is not similarly resized and remains at its current dimensions.

Figure 7:
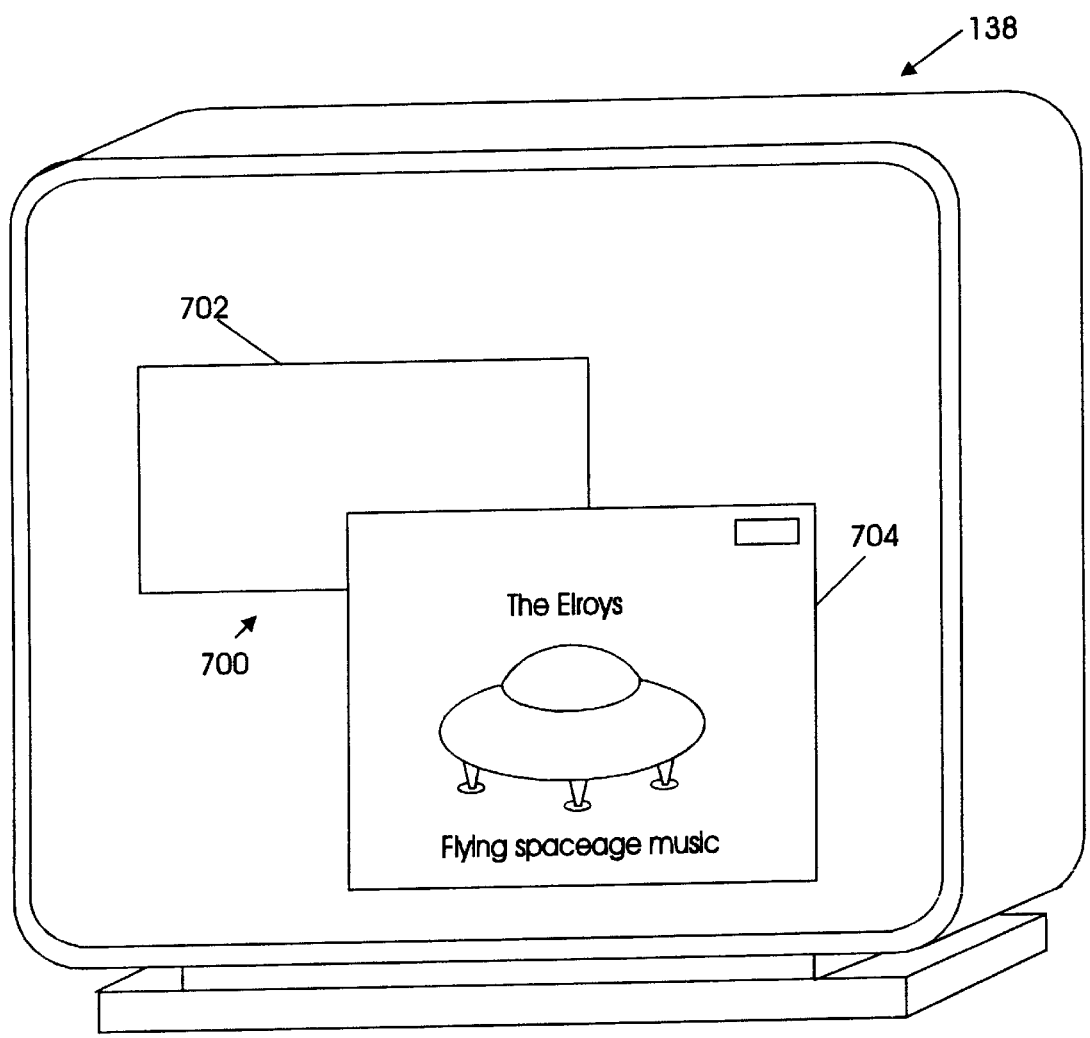
FIG. 7 illustrates, in block diagram form, a display device in accordance with one embodiment of the present invention.

As well, if the contained object is resized, the container objects remains at its original dimensions. An example of this is illustrated in FIG. 7. As illustrated in display device 138 of FIG. 7, when contained object 204 is modified to have larger dimensions, container object 202 retains its original dimensions and is not modified. It should be noted that the same principles apply when the container objects and contained objects are moved after the contained object has been removed from the container object.

Figure 8:
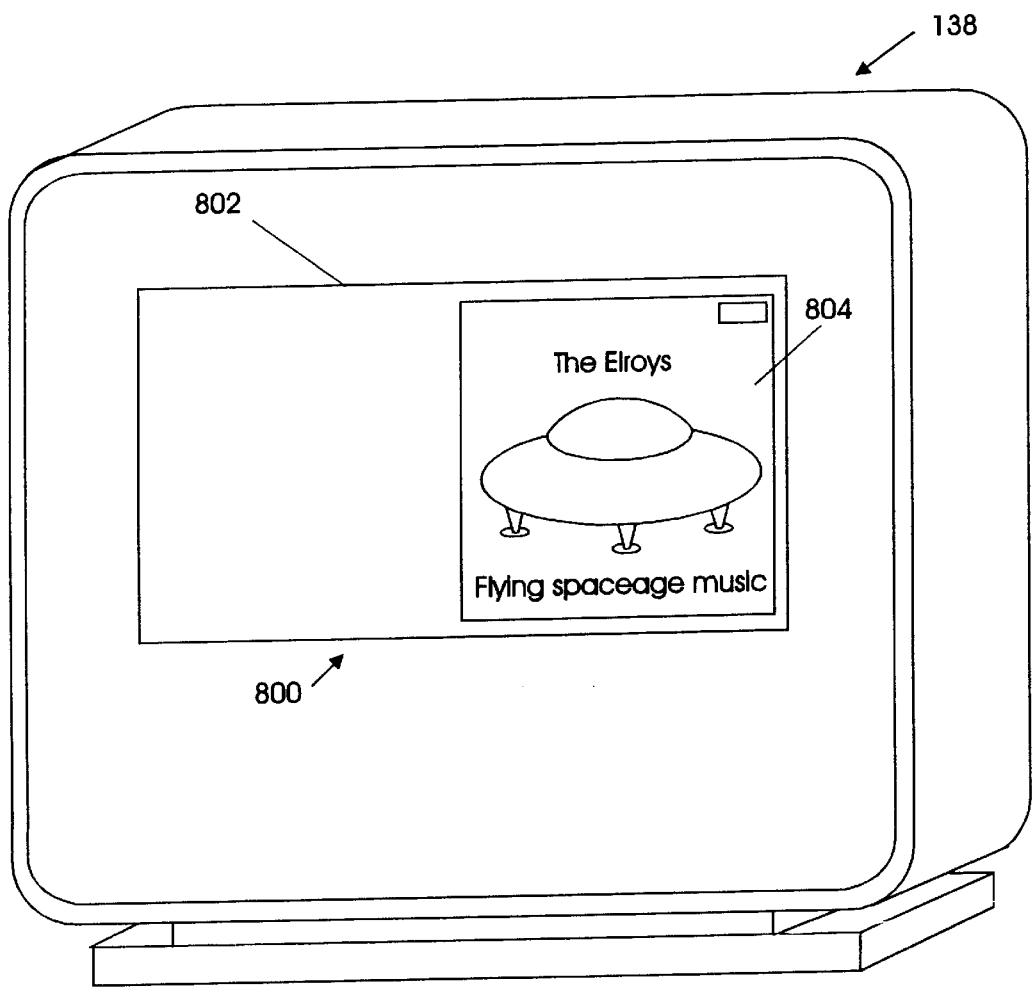
FIG. 8 illustrates, in block diagram form, a display device in accordance with one embodiment of the present invention.

FIG. 8 illustrates a display device 138 in which the contained object has been returned to the container object. In this case, contained object 204 has been returned to its original position in container object 202. When contained object 204 has been superimposed over container object 202 again, the two may again be resized, moved and closed in unison.

Figure 9A:
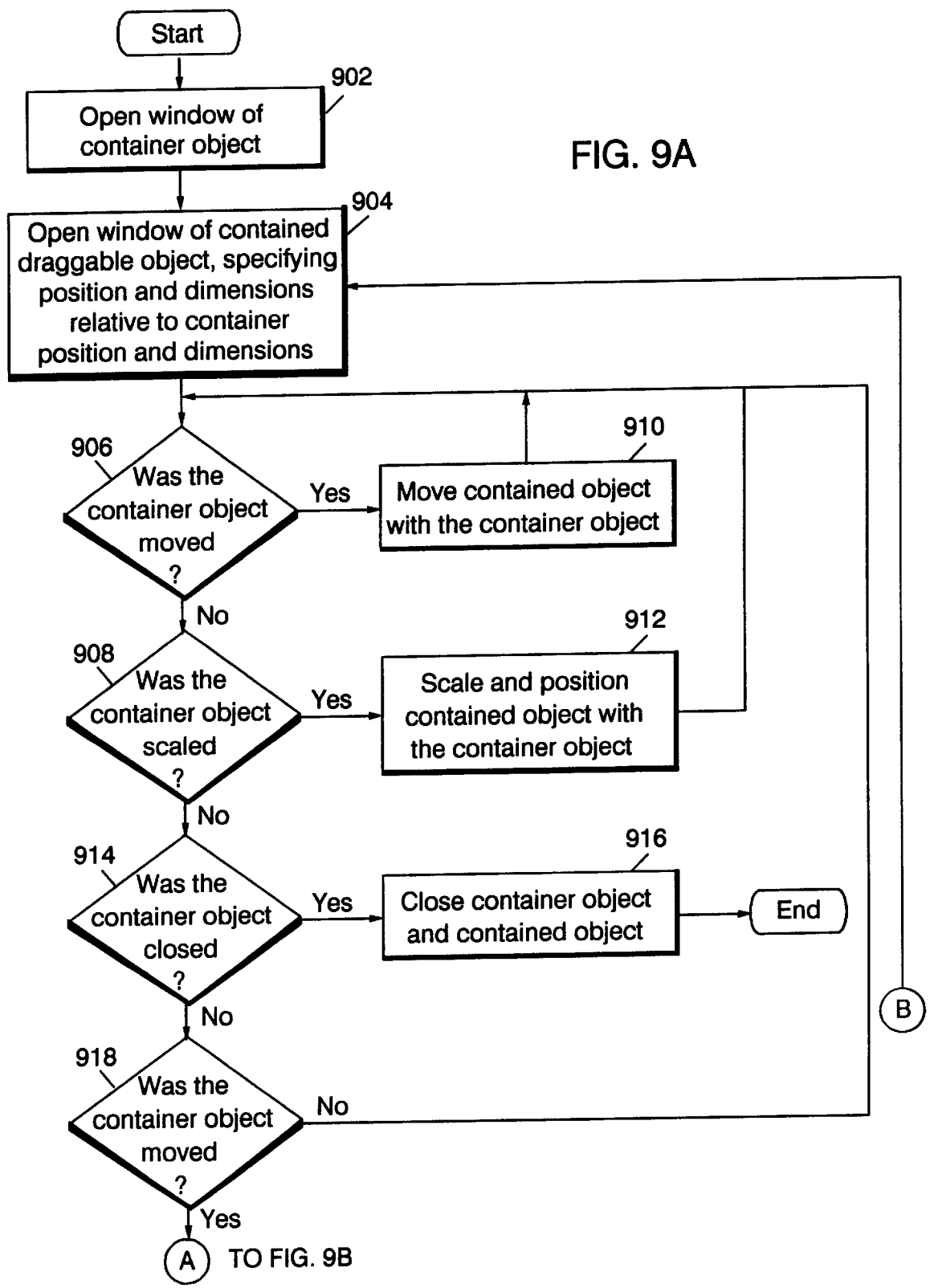
FIG. 9-A illustrates, in flow diagram form, a methodology for implementing the present invention.

A methodology for implementing the present invention is illustrated in FIGS. 9-A and 9-B. In the first step of the methodology of the present invention, a window of a container object must be opened in a step 902. Subsequently, a window of a contained object must then be opened in step 904. When the window of the contained object is opened, the position and dimensions of the window of the contained object relative to the window of the container object are specified. At step 904, display device 138 may appear as it is illustrated in FIG. 2.

Next, it is determined whether the container object has been moved in a step 906. If the container object has been moved, the contained object is moved with the container object in a step 910. This step is illustrated in greater detail in FIG. 4.

If the container object was not moved, it is next determined in step 908, whether the container object was scaled. If the container object was scaled, both the contained object and the container object are scaled and positioned in unison in step 912. If the container object was not scaled, it is next determined whether the container object was closed in step 914. If the container object has been closed, both the container object and the contained object are closed in step 916.

Next, it must be determined whether the contained object was moved in a step 918. If the container object was moved, the contained object is not moved in a step 924. Furthermore, if the container object was not moved, it is next determined whether the container object was scaled in a step 926. If the container object was scaled, the container object is scaled and repositioned. However, the contained object is not scaled or repositioned in a step 928. Next, it must be determined whether the contained object was moved in step 930. If the contained object was moved, the container object is not moved in a step 932. If the contained object was not moved, it must next be determined whether the contained object was scaled in step 933. If the contained object was scaled, the contained object is scaled and repositioned, but the container object is not scaled or repositioned in a step 934. Furthermore, it must next be determined whether the contained object was closed in a step 936. If the contained object is closed, the window of the contained object is again opened and superimposed over the open window of the container object. If the contained object was not closed, it is next determined whether or not the container object was closed in a step 938. If the container object was closed, both the contained object and the container object are closed. If the container object was not closed, then program control returns to step 922.

Through the illustrations and methodology illustrated herein, the present invention provides a method for performing "drag and drop" operations of objects in a development system which does not support such operations. The superimposing of a second window over a first window to simulate composite objects allows an external user to interface with a computer in an efficient and easily understood manner. To more fully understand operation of the present invention, a pseudocode solution for implementing the present invention in JAVA, or another development system which does not support "drag and drop" operations is provided herein:

Psuedocode of Solution
START
   Create a window for container object
   For embedded object in container
      Create a window & superimpose at size and position of embedded object
      Set "object is contained" flag TRUE
   USER MOVES CONTAINER
      Move container
      If embedded object is contained, then
         Move embedded object the same as container
   USER SCALES CONTAINER
      Scale container
      Track scale factor
      Track position of offset of origin
      If embedded object is contained, then
         Scale and offset embedded object accordingly
   USER MOVED EMBEDDED OBJECT
      Move embedded object
      If embedded object is inside area of container, then
         Set "object is contained" flag TRUE
      If embedded object is outside area of container, then
         Set "object is contained" flag FALSE
   USER SCALED EMBEDDED OBJECT
      Scale embedded object (note: if contained, scaling is currently not supported. If it was supported, then it would be limited to within the container.)
   USER CLOSES CONTAINER
      End
   USER CLOSES EMBEDDED OBJECT
      End
END Upon the execution and implementation of such a pseudocode solution, the present invention implements a data processing system which performs "drag and drop" operations of compound objects using a development system, such as JAVA, which does not support compound objects and containment interface designs. The implementation of the invention described herein is provided by way of example only. However, many other implementations exist for executing the function described herein.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   a display device for displaying a first object and a second object, wherein one of the first and second objects is selectively superimposed over an other one of the first object and the second object, said first and second objects being independent windows;
   a user interface for receiving a plurality of control inputs for controlling an appearance of the first object and the second object displayed by the display device; and
   a data processor, comprising a central processing unit, wherein the central processing unit is coupled to the user interface for receiving the plurality of control inputs and coupled to the display device to provide a plurality of object control signals for selectively modifying an appearance of the first object and an appearance of the second object concurrently when one of the first and the second objects is superimposed over the other of the first object and second object.

2. The data processing system of claim 1 wherein the second object is superimposed over the first object to simulate a compound object.

3. The data processing system of claim 2 wherein the first object simulates a container object and the second object simulates a contained object.

4. The data processing system of claim 1 wherein the appearance of the second object is modified independently of the appearance of the first object when the second object is in a first position.

5. The data processing system of claim 4 wherein the second object is in the first position when the second object is not superimposed over the first object.

6. A method for simulating compound objects in a data processing system, comprising the steps of:
   displaying a first object on a display device;
   displaying a second object on the display device;
   selectively simulating a compound object on the display device by superimposing one of the first and the second objects over the other of the first object and second object;
   selectively modifying an appearance of the first object and the second object concurrently when the second object is in a superimposed position; and
   selectively independently modifying the appearance of the first object and the appearance of the second object when the second object is in a first position, wherein the first position is distinguishable from the superimposed position.

7. The method of claim 6 wherein the second object is superimposed over the first object when the second object is in the superimposed position.

8. The method of claim 6 wherein the second object is separate from the first object when the second object is in the first position.

9. The method of claim 6, further comprising the steps of:
   moving the first object and the second object concurrently as the compound object when the second object is in the superimposed position; and
   moving the first object and the second object independently when the second object is in the first position.

10. The method of claim 6, further comprising the steps of:
   scaling the first object and the second object concurrently as the compound object when the second object is in the superimposed position; and
   scaling the first object and the second object independently when the second object is in the first position.

11. The method of claim 6, further comprising the steps of:
   closing the first object and the second object concurrently as the compound object when the second object is in the superimposed position; and
   closing the first object and the second object independently when the second object is in the first position.

12. A program storage device readable by a machine, tangibly embodying a program of instructions executable by the machine to perform method steps for simulating compound objects in a data processing system, said method steps comprising:

displaying a first object on a display device;

displaying a second object on the display device;

selectively simulating a compound object on the display device by superimposing one of the first and the second objects over the other of the first object and second object;

selectively modifying an appearance of the first object and the second object concurrently when the second object is in a superimposed position; and selectively independently modifying the appearance of the first object and the appearance of the second object when the second object is in a first position, wherein the first position is distinguishable from the superimposed position.

13. The program storage device of claim 12, further comprising the steps of:

moving the first object and the second object concurrently as the compound object when the second object is in the superimposed position; and moving the first object and the second object independently when the second object is in the first position.

14. The program storage device of claim 12, further comprising the steps of:

scaling the first object and the second object concurrently as the compound object when the second object is in the superimposed position; and scaling the first object and the second object independently when the second object is in the first position.

15. The program storage device of claim 12, further comprising the steps of:

closing the first object and the second object concurrently as the compound object when the second object is in the superimposed position; and closing the first object and the second object independently when the second object is in the first position.

16. The program storage device of claim 12 wherein the second object is superimposed over the first object when the second object is in the superimposed position.

17. The program storage device of claim 12 wherein the second object is separate from the first object when the second object is in the first position.

* * * * *